(12) United States Patent  
Marini

(10) Patent No.: US 9,028,002 B2  
(45) Date of Patent: May 12, 2015

(54) DOUBLE SPRING LEG REST

(71) Applicant: PAC Seating Systems, Inc., Palm City, FL (US)

(72) Inventor: Hector Noel Marini, Palm City, FL (US)

(73) Assignee: PAC Seating Systems, Inc., Palm City, FL (US)

( * ) Notice: Subject to any disclaimer, the term of this patent is extended or adjusted under 35 U.S.C. 154(b) by 70 days.

(21) Appl. No.: 13/838,621

(22) Filed: Mar. 15, 2013

(65) Prior Publication Data

US 2014/0265511 A1    Sep. 18, 2014

(51) Int. Cl.
*A47C 7/50*    (2006.01)
*B60N 2/44*    (2006.01)
*B64D 11/06*    (2006.01)

(52) U.S. Cl.
CPC .............. *B60N 2/4495* (2013.01); *B64D 11/06* (2013.01); *B64D 11/0643* (2014.12); *Y02T 50/46* (2013.01)

(58) Field of Classification Search
CPC .......................... B60N 2/4495; B64D 11/0643
USPC .............. 297/69, 70, 423.19, 423.26, 423.28, 297/423.29, 423.3, 423.2, 423.22, 423.23, 297/423.24
See application file for complete search history.

(56) References Cited

U.S. PATENT DOCUMENTS

| | | | |
|---|---|---|---|
| 4,509,795 A * | 4/1985 | Brennan et al. .......... | 297/423.32 |
| 4,534,594 A * | 8/1985 | Lucien ....................... | 297/423.4 |
| 5,056,862 A | 10/1991 | May et al. | |
| 5,352,020 A * | 10/1994 | Wade et al. .............. | 297/423.26 |
| 7,100,985 B2 | 9/2006 | Wagner et al. | |
| 2003/0209933 A1* | 11/2003 | Flory et al. ................ | 297/423.36 |
| 2006/0158015 A1* | 7/2006 | Tsuji et al. ................ | 297/423.19 |
| 2008/0164737 A1* | 7/2008 | Fowlds et al. ............. | 297/284.4 |
| 2009/0315376 A1* | 12/2009 | Nishiwaki .................. | 297/301.2 |
| 2010/0244534 A1 | 9/2010 | Driessen et al. | |
| 2011/0240797 A1* | 10/2011 | Behe ......................... | 244/122 R |
| 2013/0099538 A1* | 4/2013 | Jussli et al. ................ | 297/313 |

OTHER PUBLICATIONS

European Search Report dated Nov. 11, 2014, which issued during prosecution of European Application No. 14160086.6, which corresponds to the present application.

* cited by examiner

*Primary Examiner* — Kristina Junge
(74) *Attorney, Agent, or Firm* — Troutman Sanders LLP

(57) ABSTRACT

A vehicle seat can include a seat bottom frame having a front, a back opposite the front, and enclosing a volume. Pivotally connected to the back of the seat bottom frame can be a seat back frame and pivotally connected to the front of the seat bottom frame can be a seat leg rest. The seat leg rest has a length. Mounted in the volume of the seat frame are at least two leg rest springs which are connected to the leg rest. When the leg rest springs are actuated, the seat leg rest can be directly pivoted approximately and incrementally parallel with the seat bottom frame. The two leg rest springs are mounted a first distance apart and the first distance is less than half of the length of the leg rest.

6 Claims, 3 Drawing Sheets

DOUBLE SPRING LEG REST

FIELD OF THE INVENTION

The present invention relates to a vehicle seat, preferably an airplane seat, with a tiltable part triggerable by an actuating pan utilizing dual gas springs.

BACKGROUND

Certain aircraft passenger seats have individual seat components, including a leg rest and a backrest. These seat components can be moved by an actuating device triggered by a hand operated actuator which can adjust the seat to the requirements of the seat occupant. Hand levers are modeled to the contours of the seat as part of the actuator.

Typical tilt adjustment devise for seat parts, such as a backrest or leg rest, typically use only one actuation device. For example, for leg rests, usually only one spring is used. However, this single point engagement leads to twisting or torsion of the leg rest when the single sarin is mounted off-center to the leg rest. If the single spring is center mounted to the leg rest. It can become unstable, since the occupant's legs may not be balanced, putting the leg rest off balance.

Other solutions in the prior art still only use one actuation device, but include a complex mechanism to distribute the forces generated by the actuation device. Also, weight is a very significant factor in designing any structure for an aircraft. Weight relates directly to fuel consumption. For this reason every effort is made to design structures to be used in aircraft to be as light as possible consistent with other requirements. So while the mechanism distributes the forces, it increases the weight.

Thus, there is a need for a stable leg rest design that is lighter than existing solutions.

SUMMARY

The teachings herein alleviate one or more of the above noted problems with the leg rest of vehicle seats, specifically aircraft seats.

A vehicle seat, which in one example is an aircraft seat, ran include a seat bottom frame having a front, a back opposite the front, and enclosing a volume. Pivotally connected to the back of the seat bottom frame can be a seat back frame and pivotally connected to the front of the seat bottom frame can be a seat leg rest. The seat leg rest has a length. Mounted in the volume of the seat frame are at least two leg rest springs which are connected to the leg rest. In one example, the springs are gas springs. When the leg rest springs are actuated, the seat leg rest can be directly pivoted approximately and incrementally parallel with the seat bottom frame. "Directly" in this example means that there are no intermediate workings to transmit or distribute the force of the springs. The two leg rest springs are mounted a first distance apart and the first distance is less than half of the length of the leg rest. In other examples, the first distance can be greater than or equal to ⅓ of the length. Alternately, the first distance can be greater than ¼ of the length.

Further, the two leg rest springs can have a combined weight which is less than a weight of a comparable single spring. Additionally, the two leg rest springs can have a combined force which is greater than a force of a comparable single spring. The two leg rest springs can be controlled from the same actuator yet act independent of each other. "Independent" in this example means that there is no mechanism that synchronizes the springs after they are actuated. They can be actuated simultaneously or essentially simultaneously, but that can be the only synchronizing factor.

Additional advantages and novel features will be set forth in part in the description which follows, and in part will become apparent to those skilled in the art, upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
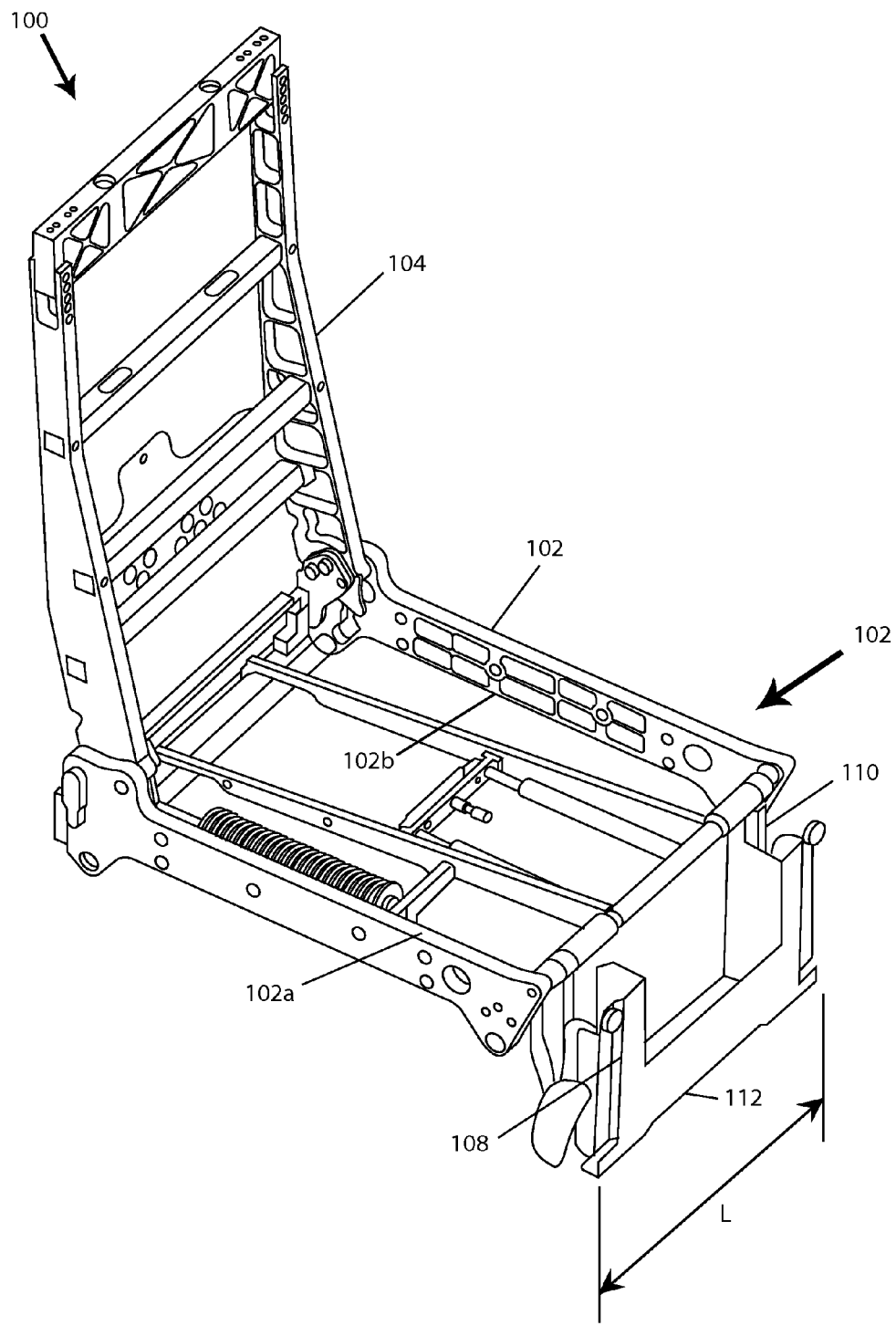
FIG. 1 is a top, front, left prospective view of an airplane seat with an example of an actuation system of the present invention.
Figure 2:
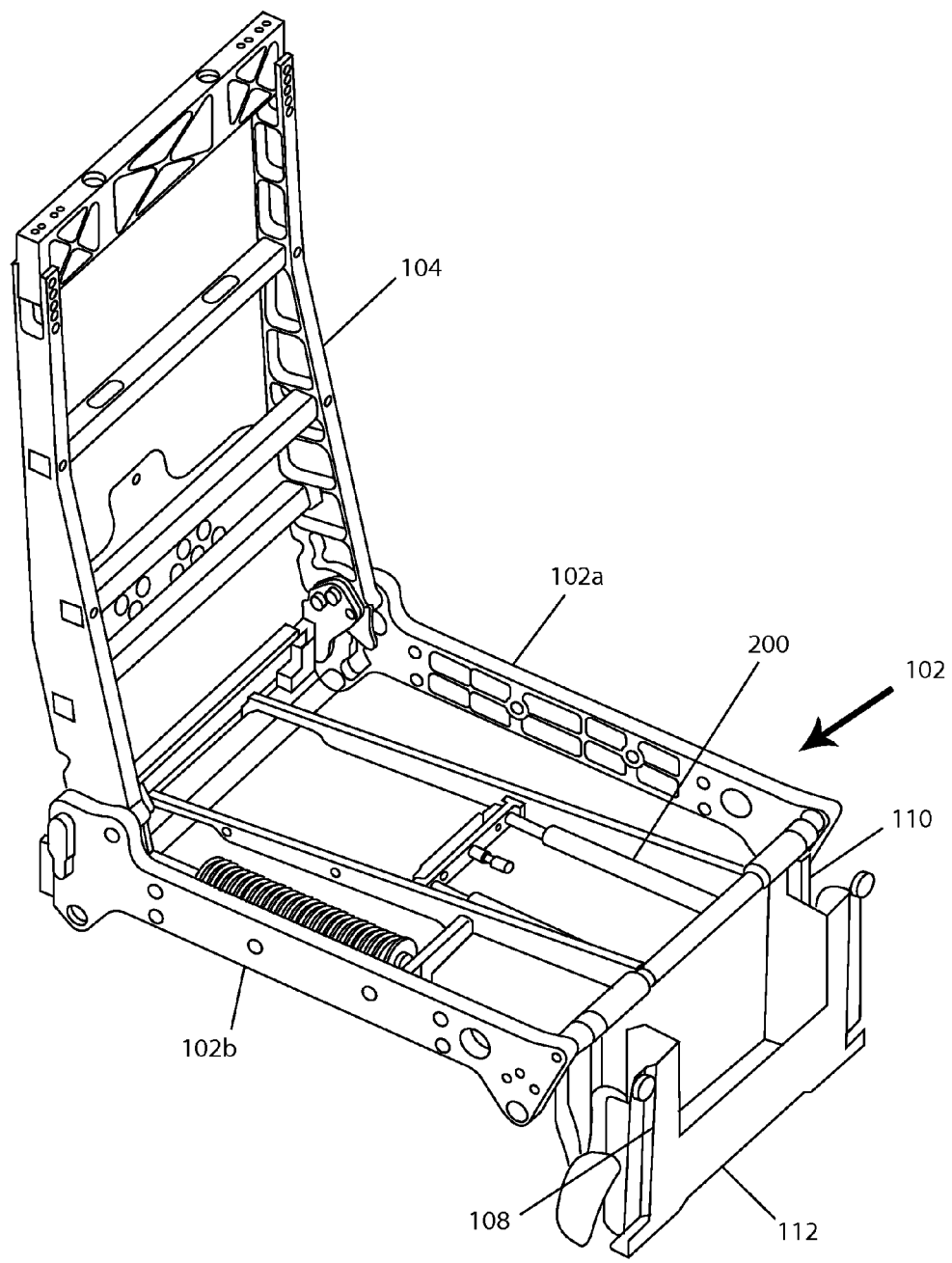
FIG. 2 is a top, front, right prospective view of the airplane seat of FIG. 1.
Figure 3:
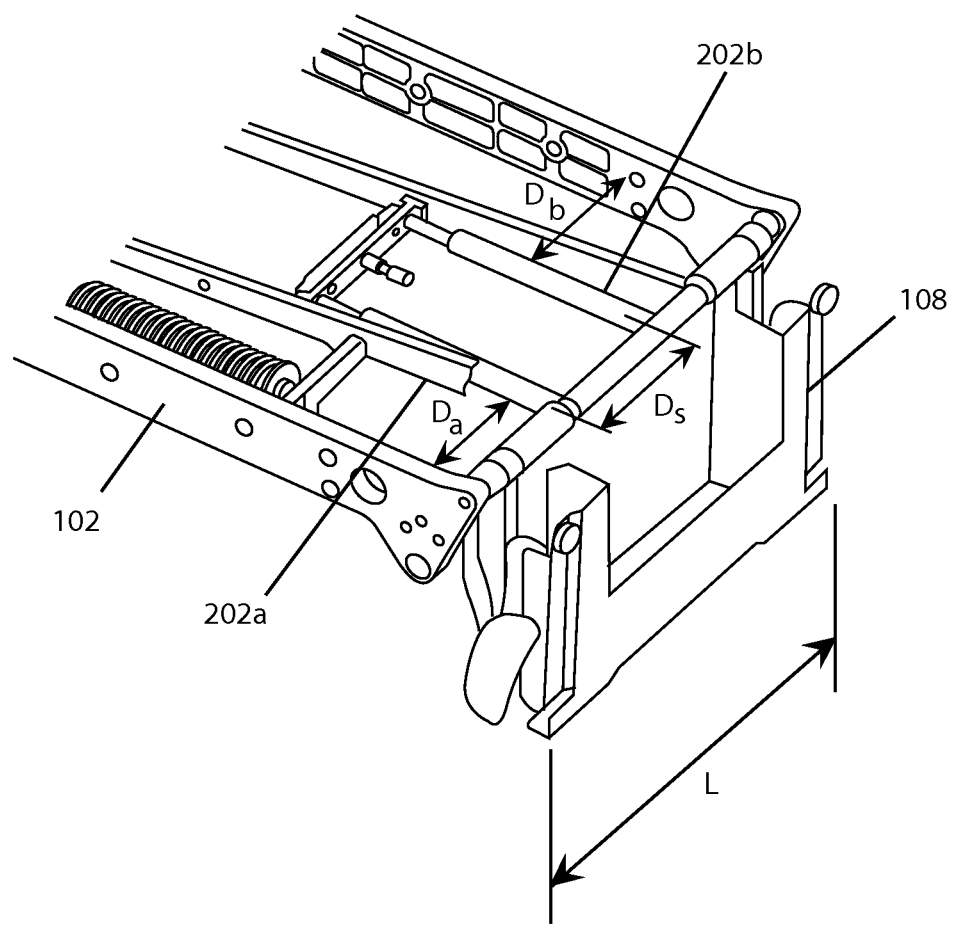
FIG. 3 is a top, front, right sectioned prospective view of the leg rest.

An example of the vehicle seat of the present invention shown in FIGS. 1-3 and is an aircraft passenger seat, as is conventionally used in airliners for passengers. The aircraft seat 100 has a seat frame 102. The seat frame 102 typically has an upper surface 102a and a lower surface 102b. These surfaces 102a, 102b correspond to a top and bottom of the seat frame 102 and form a volume therebetween to permit space for seat operation mechanisms. Attached to the lower surface 102b of the seat frame 102 can be one or more stanchions (not illustrated). The stanchion can take any shape or configuration to be used to secure the aircraft seat 100 to the aircraft. Further, a back member 104 can be attached to the upper surface 102a of the seat frame 102 approximately perpendicular to the seat frame 102 to support an occupant's back and shoulders. As is well known, the back member 104 can recline from approximately perpendicular to a wide variety of ranges from a few degrees to approximately parallel to the seat frame 102.

Also attached to the seat frame 102, opposite the back member 104, is a leg rest 108. The leg rest 108 has an attached end 110 and a free end 112. Like the back member 104, the leg rest 108 can be pivotally attached the seat frame 102 at the attached end 110. In an example, the free end 112 is directed downwards approximately perpendicular and in this position does not provide support for the occupant's legs. As is well known, the leg rest 108 can begin from approximately perpendicular to raise upwards a wide variety of ranges from a few degrees to approximately parallel to the seat frame 102. Once the leg rest 108 begins to raise, it can begin to partially, then completely, support the occupant's legs.

The movement of the leg rest 108 can be dictated by an actuation system 200. This actuation system 200 can include two or more leg springs 202 and an actuation mechanism (not illustrated) allowing the occupant to raise and lower the footrest 108 from perpendicular to the seat frame 102 to parallel thereto. The leg rest 108 has a length L, which is approximately the length of the seat frame 102. Along this length L on the attached end 110, the leg rest 108 is pivotally attached to the seat frame 102 and attached to at least the two or more leg springs 202.

The leg springs 202 are spaced a distance Ds from each other, within the seat frame 102. Further, each leg spring 292a, 202b can be spaced a first distance Da and a second distance Db from the opposing ends of the seat frame 108. In one example, the distances Da, Db, Ds are equal. In other examples, they are not equal or only two of the three distances are equal. In a further example, the three distances are approximately equal to the length L of the leg rest 108.

FIG. 3 illustrates an example where the leg springs 202 are spaced from the sides of the seat frame 102 and the spacing distance Ds is less than half of the leg rest 108 length L. In some examples $Ds \geq \frac{1}{3}L$ or $Ds > \frac{1}{4}L$. The spacing distance Ds, allows the both leg springs 202 to act as one, but also leave enough of a gap wherein there is little or no twisting of the leg rest 108.

To save weight, one example of the present invention, the two or more leg springs 202 are gas springs. This is typically counterintuitive since doubling the leg springs increases the weight of the airplane unnecessarily. However, the two or more leg springs 202 can each have a weigh W, equaling a combined weight of 2×W, which is less than a weight Wss of a single gas spring. Written differently, $2W \leq Wss$ or $W \leq Wss/2$.

The leg springs 202 in another example have a resistive force F, leading to a combined resistive force of 2×F. The combined force 2F of the leg springs 202 is greater than the force of the single spring Fss. Written differently, $2F \geq Fss$ or $F \geq Fss/2$. Each spring's 202a force is released distinct from the other spring's 102b. However, the individual forces, although smaller in part, are greater once combined.

The combination of both the lower weight and stronger force corrects a number of issues in the prior art. With the low weight the chair is lighter while there are two leg springs than when there was just one. The stronger force allows the two leg springs 202 to move a heavier leg rest, for the same weight. The stronger three can move the old leg rest faster.

Further, one example of the present invention alleviates the need for complex mechanisms to "balance" the leg springs 202. In an example, each of the leg springs 202 act independent of each other, but can be controlled from the same actuator. In a further example, the leg springs 202 act independent of any other intermediate mechanism to distribute their force or synchronize the actuation of the leg rest. The leg springs 202 are set stiff enough as to not allow the springs 202 to get out of synch. That is to say, the leg springs 202 act slow enough so that one leg spring 202a cannot extend or contract fast enough to outpace the other leg spring 202b and twist or skew the leg rest 108.

As examples, various features have been mainly described above with respect to an airplane seat. In other implementations, features described herein may be implemented mainly in one or more other types of seats, including automobile seats.

It will also be apparent that various features described above may be implemented in many different forms in the implementations illustrated in the figures. The actual various features are not limiting.

In the preceding specification, various examples have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle seat comprising:
   a seat bottom frame having a front, a back opposite the front, a top, bottom opposite the top and the top and the bottom enclosing a volume;
   a seat stanchion, attached to the bottom of the seat bottom frame, attaching the vehicle seat to the vehicle;
   a seat leg rest pivotally connected to the front of the seat bottom frame and having a length; and
   at least two leg rest springs are mounted in the volume approximately parallel to each other and approximately parallel to the seat bottom frame and connected to the leg rest;
   wherein when the at least two leg rest springs are actuated in the same direction, the seat leg rest is directly pivoted approximately and incrementally parallel with the seat bottom frame,
   wherein a majority of the two leg rest springs remain internal to the seat bottom frame when actuated,
   wherein the two leg rest springs are mounted a first distance apart, and
   wherein the first distance is less than half of the length of the leg rest.

2. The vehicle seat of claim 1, wherein the first distance can be greater than or equal to ⅓ of the length.

3. The vehicle seat of claim 1, wherein the first distance can be greater than ¼ of the length.

4. The vehicle seat of claim 1, wherein the two leg rest springs are controlled from a single actuator.

5. The vehicle seat of claim 1, wherein the two leg rest springs are gas springs.

6. The vehicle seat of claim 1, wherein the two leg rest springs are mounted independent of each other.

* * * * *